No. 894,776. PATENTED JULY 28, 1908.
G. H. GRUSS.
VEHICLE WHEEL.
APPLICATION FILED APR. 18, 1907.
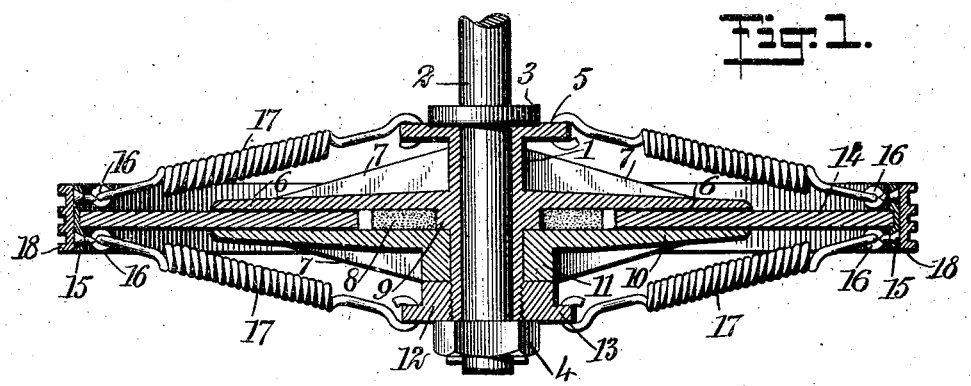
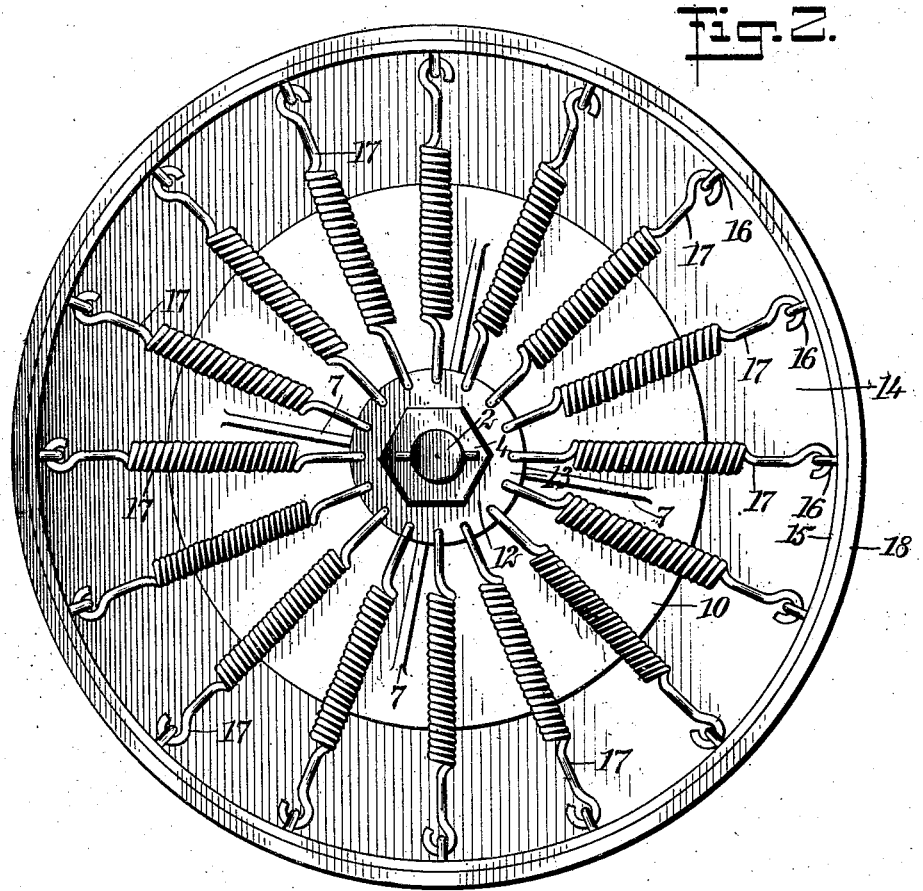
WITNESSES
INVENTOR
George Hopkins Gruss
BY
ATTORNEYS

UNITED STATES PATENT OFFICE.

GEORGE HOPKINS GRUSS, OF GOLDFIELD, NEVADA.

VEHICLE-WHEEL.

No. 894,776.  Specification of Letters Patent.  Patented July 28, 1908.

Application filed April 18, 1907. Serial No. 368,871.

*To all whom it may concern:*

Be it known that I, GEORGE HOPKINS GRUSS, a citizen of the United States, and a resident of Goldfield, in the county of Esmeralda and State of Nevada, have invented a new and Improved Vehicle-Wheel, of which the following is a full, clear, and exact description.

This invention relates to certain improvements in wheels designed for use on automobiles or other vehicles and in which the outer rim or tire is secured to the hub by a set of spiral spring spokes and a resilient cushion, whereby the vehicle upon which the wheel is used is relieved from all jar or concussion due to road obstructions, and whereby the normal life and efficiency of the wheel is materially increased.

Reference is to be had to the accompanying drawings forming a part of this specification, in which similar characters of reference indicate corresponding parts in all the figures, in which Figure 1 is a central section through one form of my improved wheel; and Fig. 2 is a side elevation thereof.

The particular form of wheel involving my invention which is illustrated in the accompanying drawings, comprises a hub 1 adapted to rotate on the axle 2 between a collar 3 located thereon and the locking nut 4 on the end of the axle. The hub comprises a cylindrical sleeve adapted to fit the axle and carries a flange 5, preferably integral therewith and to which the spokes of one side are secured. The cylindrical sleeve also carries a much larger annular flange 6, strengthened by braces 7 and serving to form one side of the recess within which lies the resilient packing 8. At the base of this flange 6 is an offset portion 9 of substantially the same thickness as the resilient packing and against which abuts a second flange 10 exactly similar to the flange 6. This second flange is carried by a collar 11, sliding on the cylindrical sleeve of the hub, and is spaced from the flange 6 by the offset portion 9.

For holding the flange 10 and its collar 11 in place, I provide a nut 12 screw-threaded on the end of the sleeve of the hub and adapted to force the collar 11 against the offset portion 9 and bind the latter rigidly in place. The outer surface of the nut when in place, is preferably flush with the end of the sleeve, and said nut carries a flange 13 of substantially the same diameter as the flange 5 and spaced the same distance from the center of the offset portion as is the flange 5. Both of these flanges are provided with perforations around their circumferences and to which the spokes are attached.

Between the two central flanges 6 and 10 and extending in a ring around the offset portion 9, is placed the resilient packing 8, which latter may be of any suitable material but preferably of rubber. Surrounding this packing but normally out of engagement therewith is an annular plate 14 of substantially the same thickness as the distance between the central flanges 6 and 10 and having shrunk on its outer circumferential edge an inner tire 15, which latter is provided with a series of eyes 16, riveted thereto and into which the ends of the spokes are secured. These spokes 17 are formed with hooks upon each end adapted to engage with the eyes 16 and the perforations in the flanges 5 and 13, and the main body of each spoke constitutes a coil spring, whereby its length may be varied as the vehicle passes over obstacles in the road. The annular plate 14 does not normally engage with the inner packing 8, there being an annular space therebetween. When the wheel strikes an obstacle in the road, the spring spokes permit the inner edge of the annular plate to engage with the packing to compress the same.

Surrounding the inner tire 15 and shrunk thereon is a solid surface tire 18, preferably having a plurality of grooves extending entirely around the tire to prevent the same from slipping on smooth or slippery roads and affording a better working surface.

In my improved wheel above described, the entire weight is normally borne upon the coil springs, the cushion 8 serving merely as an auxiliary shock absorber, so that the vehicle is relieved from jars to a much greater extent than when the entire load is borne upon a single pneumatic tire. The plate 14 closely fitting between the flanges 6 and 10 and having the inner tire 15 secured thereto prevents any possibility of the wheel being crushed sidewise and insures the stiffness and stability of the same, while the flanges 6 and 10 which inclose this plate are rendered perfectly secure and firm by the braces 7.

It will be noted that many minor changes may be made in the specific wheel hereinbefore described and illustrated in the drawings without departing from the spirit of my invention.

Having thus described my invention, I claim as new and desire to secure by Letters Patent:

A vehicle wheel, comprising a hub having a cylindrical sleeve adapted to fit an axle, radial flanges at the ends of said sleeve, each of said flanges being provided with a row of perforations around its outer edge, two radial flanges surrounding the central portion of the sleeve, a resilient packing between said last mentioned flanges, an annular plate between said flanges and surrounding said packing, an inner tire shrunk upon the outer circumference of said plate, eyes carried by said inner tire, a plurality of spiral spring spokes connecting said eyes and the perforations in said first mentioned flanges, and an outer tire surrounding said inner tire and secured thereto, said outer tire having its outer surface provided with a plurality of grooves.

In testimony whereof I have signed my name to this specification in the presence of two subscribing witnesses.

GEORGE HOPKINS GRUSS.

Witnesses:
I. B. HAZELGROVE,
JOSEPH GRUSS.